(12) United States Patent
Clement et al.

(10) Patent No.: US 6,318,511 B1
(45) Date of Patent: Nov. 20, 2001

(54) DISK BRAKE WITH HIGH THERMAL RESISTANCE

(75) Inventors: Didier Clement, Lyon; Jean-Michel Garcia, Villeurbanne; Olivier Borgeaud, Assieu, all of (FR)

(73) Assignee: Messier-Bugatti, Villacoublay (FR)

( * ) Notice: Subject to any disclaimer, the term of this patent is extended or adjusted under 35 U.S.C. 154(b) by 0 days.

(21) Appl. No.: 09/600,943

(22) PCT Filed: Nov. 23, 1999

(86) PCT No.: PCT/FR99/02875

§ 371 Date: Jul. 24, 2000

§ 102(e) Date: Jul. 24, 2000

(87) PCT Pub. No.: WO00/31430

PCT Pub. Date: Jun. 2, 2000

(30) Foreign Application Priority Data

Nov. 25, 1998 (FR) .................................................. 98 14824

(51) Int. Cl.⁷ .................................................. F16D 55/02
(52) U.S. Cl. .................... 188/71.6; 188/58; 188/71.5; 188/264 A; 188/72.9; 192/85 L; 192/85 LA; 192/113.4; 192/113.2
(58) Field of Search .................... 188/58, 71.5, 71.6, 188/72.6, 72.9, 264 A, 264 R, 59; 192/85 L, 85 LA, 113.2, 113.4

(56) References Cited

U.S. PATENT DOCUMENTS

| | | | |
|---|---|---|---|
| 4,102,438 | * 7/1978 | Rancourt | 188/18 A |
| 5,058,712 | * 10/1991 | Noah | 188/59 |
| 5,069,321 | * 12/1991 | Reik et al. | 192/70.17 |
| 5,407,032 | * 4/1995 | Gaudefroy et al. | 188/58 |
| 5,538,109 | * 7/1996 | Swank | 188/264 G |
| 5,671,827 | * 9/1997 | Demetriou et al. | 188/71.6 |
| 5,992,577 | * 11/1999 | Souetre | 188/71.5 |
| 6,006,869 | * 12/1999 | Rancourt et al. | 188/71.5 |
| 6,056,089 | * 5/2000 | Karlsson et al. | 188/71.6 |

FOREIGN PATENT DOCUMENTS

| | | |
|---|---|---|
| 9400821 | 3/1994 | (DE) . |
| 2697218 | 4/1994 | (FR) . |
| WO 9725548 | 7/1997 | (WO) . |

* cited by examiner

Primary Examiner—Douglas C. Butler
Assistant Examiner—Bradley King
(74) Attorney, Agent, or Firm—Weingarten, Schurgin, Gagnebin & Hayes LLP

(57) ABSTRACT

The friction device comprises a non-rotary casing (50) in the form of a cage in which there are received a thrust structure (30), a set of friction disks (21, 22, 23, 24, 25) on a common axis, and a backing structure (40), the casing having a peripheral wall provided with ventilation openings (54). The friction device is actuated by a pneumatic actuator (60) mechanically connected to the central portion of the thrust structure through a central opening in an end wall (51) of the casing. Thermal insulation is arranged between the set of disks (21, 22, 23, 24, 25) and the outside of the casing adjacent to the end wall provided with the bearing unit (11) for the rotary shaft (10), and comprises at least one heat barrier (76–77, 78–79) situated at the bearing unit (11).

12 Claims, 4 Drawing Sheets

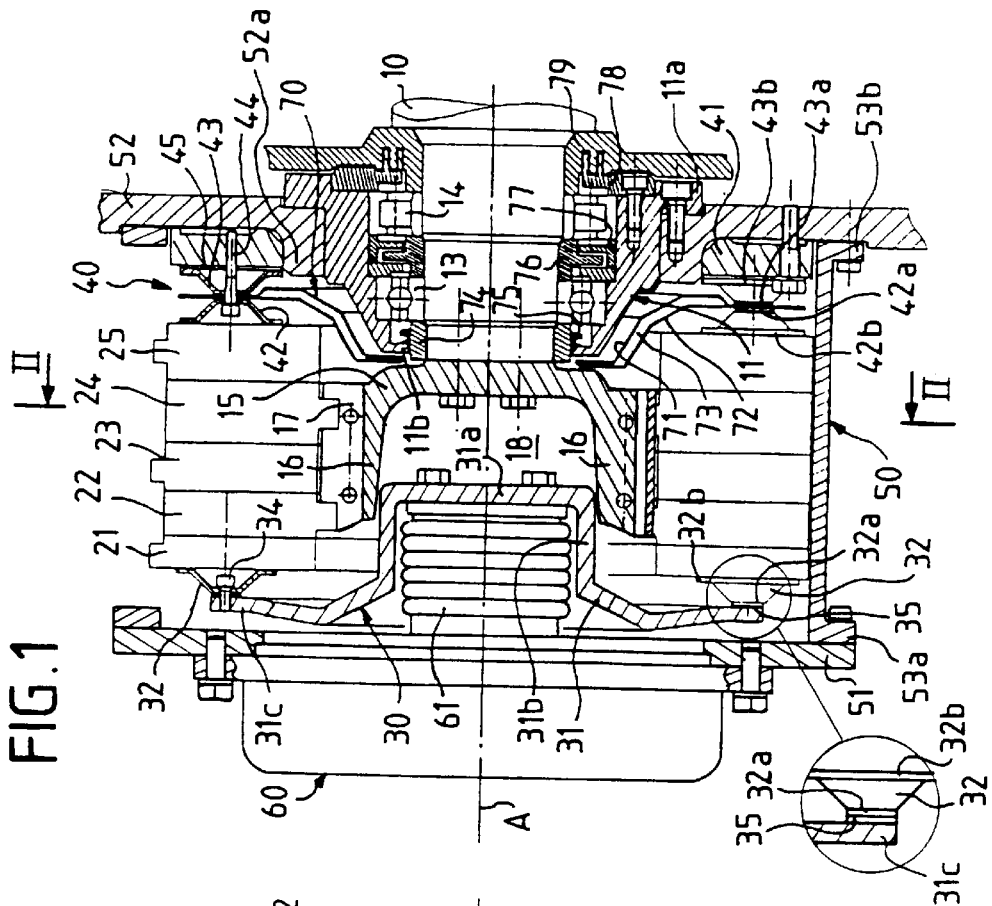
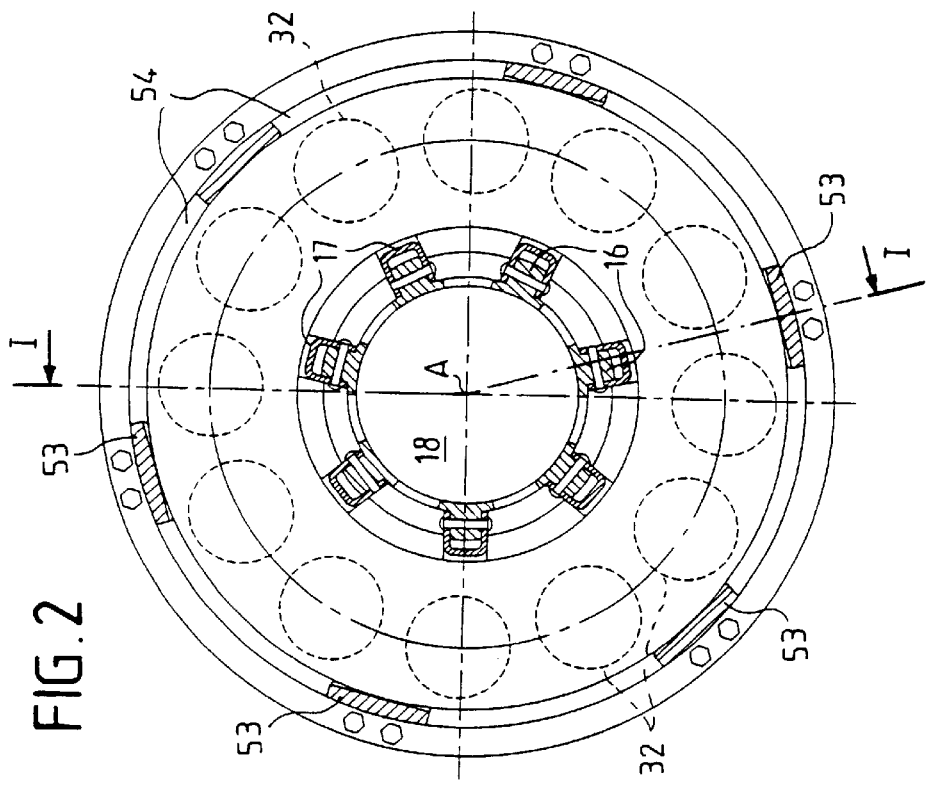

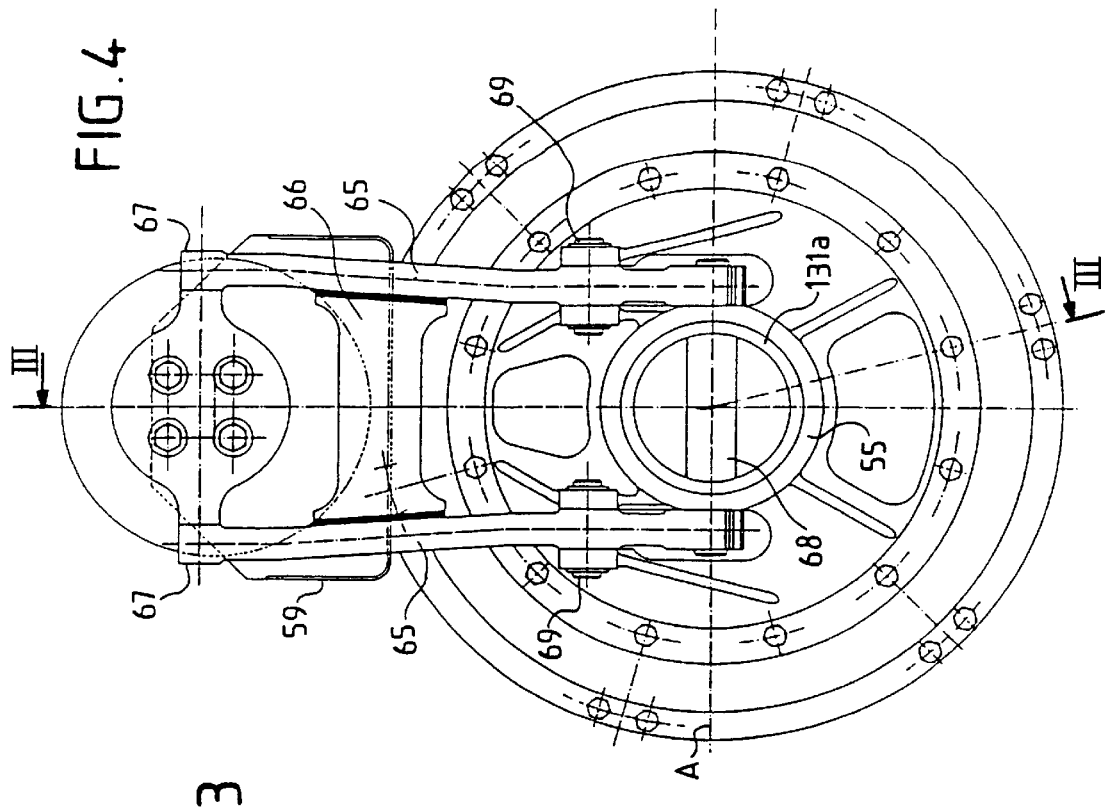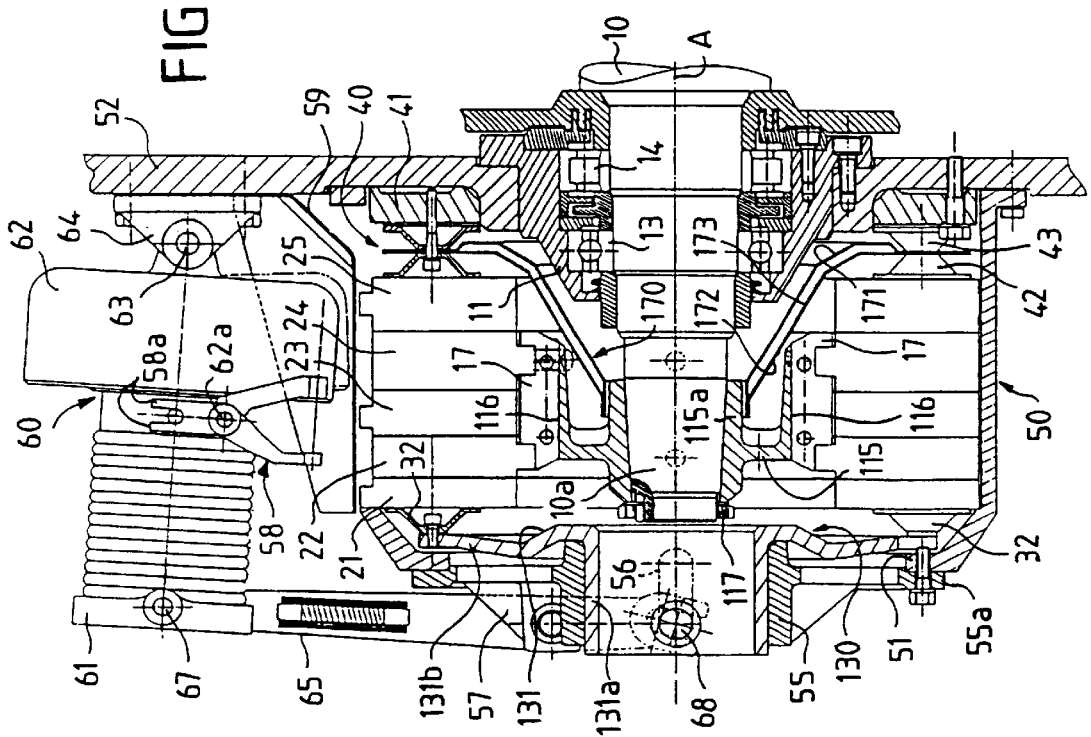

DISK BRAKE WITH HIGH THERMAL RESISTANCE

FIELD OF THE INVENTION

The invention relates to a disk friction device for a transmission shaft. The field of application of the invention is retarding or braking a transmission, in particular for heavy road vehicles, for the motor bogies of rail vehicles, or for industrial rotary machines.

BACKGROUND OF THE INVENTION

Known retarders are frequently of the hydraulic or electromagnetic type and they give rise to problems of size and weight.

Disk brakes are also known that make use of disks made of thermostructural composite material, in particular carbon/carbon (C/C) composite material which provides very good friction behavior and also provides a large saving in weight in comparison with traditional metal disk brakes.

The use of C/C material disk friction devices has already been proposed for transmission brakes or retarders of heavy trucks. Reference can be made in particular to document FR-A-2 607 566 and patent application FR 97 06 959.

The use of such devices as axle brakes on rail vehicles has also been envisaged. Reference can be made in particular to documents FR-A-2 626 541, FR-A-2 697 218, and EP-A-0 478 943.

For heavy road vehicles or for rail vehicles, it would be advantageous to provide retarders or transmission brakes with disks of thermostructural composite material but without requiring the use of hydraulic energy.

Nevertheless, account must be taken both of the high temperatures reached by thermostructural composite materials, in particular C/C materials, when subjected to friction, and the need for high levels of force when pressing the disks together in order to obtain the desired effectiveness, and even though the space available is often very restricted.

OBJECT AND SUMMARY OF THE INVENTION

An object of the invention is to provide a disk friction device for braking or retarding an engine shaft or a transmission, the device being very compact and making it possible to use disks made of thermostructural composite material and pneumatic control.

This object is achieved by a device comprising:

a non-rotary casing having at least one end wall provided with a bearing unit for the rotary shaft;

a set of annular disks on a common axis, with at least friction portions thereof being made of a thermostructural composite material, the disks being received inside the casing and comprising at least one rotor disk constrained to rotate with the rotary shaft and at least two stator disks mounted on either side of the rotor disk and prevented from rotating relative to the casing;

a thrust structure situated facing an outside face of a first stator disk at a first end of the set of disks;

actuator means connected to the thrust structure; and a backing structure supported by the casing and situated facing an end face of a second stator disk at a second end of the set of disks:

in which device:

the casing is in the form of a cage in which there are received the thrust structure, the set of disks, and the backing structure, and comprises a first end wall at the thrust structure end, a second end wall at the backing structure end, and a peripheral wall provided with ventilation openings;

the actuator means are constituted by a pneumatic actuator mechanically connected to a central portion of the thrust structure via a central opening in the first end wall of the casing; and thermal insulation means are arranged between the set of disks and the outside of the casing beside the end wall fitted with the bearing unit for the rotary shaft, and comprising at least one heat barrier situated at the bearing unit.

In a first embodiment, the pneumatic actuator is fixed to the first end wall of the casing, beside the thrust structure, making the device compact.

In another embodiment, the pneumatic actuator is fixed to the second end wall of the casing and is connected to the thrust structure by at least one lever, thereby amplifying the thrust delivered by the actuator.

The central portion of the thrust structure can be given the shape of a setback housed in an axial passage surrounded by the disks, so that the mechanical connection between the actuator and the thrust structure extends at least in part inside said axial passage, thereby contributing to making the device more compact.

The thrust structure may be constituted by a thrust piece having a central portion connected to the actuator and an annular peripheral portion, and by a set of cups fixed on said annular peripheral portion and bearing against the outside end face of the first stator disk, thereby limiting contact area and thus limiting heat transfer between the disks and the thrust structure.

Similarly, the backing structure can be formed by an annular backing piece and a set of cups fixed to the backing piece and bearing against the outside end face of the second stator disk.

Rotary connection between the rotary shaft and the or each rotor disk can be achieved by means of a piece fixed on the shaft and provided with riders which penetrate into notches formed in the inside periphery of the or each rotor disk, the riders being made of a material that is a poor conductor of heat so as to limit heat transfer between the disks and the rotary shaft.

In addition, it is advantageous to provide at least one heat screen situated inside the casing between the set of disks and the bearing unit for the rotary shaft. The heat screen can be carried by the backing structure.

The heat barrier situated at the bearing unit is constituted, for example, by at least one baffle constraining air to follow a tortuous path along the bearing unit. This heat barrier, which is advantageously combined with a heat screen inside the casing, provides effective opposition to the transfer of the heat generated by friction from the disks to the drive or transmission members coupled to the rotary shaft outside the casing.

BRIEF DESCRIPTION OF THE DRAWINGS

In the following detailed description, reference is made to the accompanying drawings, in which:

FIG. 1 is a section view on planes I—I of FIG. 2 showing an embodiment of a disk friction device of the invention, for a motor bogie brake of a rail vehicle;

FIG. 2 is a section view on plane II—II of FIG. 1;

FIG. 3 is a section view on planes III—III of FIG. 4 showing another embodiment of a disk friction device of the invention for a motor bogie brake of a rail vehicle;

FIG. 4 is a section view on planes IV—IV of FIG. 3;

DETAILED DESCRIPTION OF PREFERRED EMBODIMENTS

Figure 5:
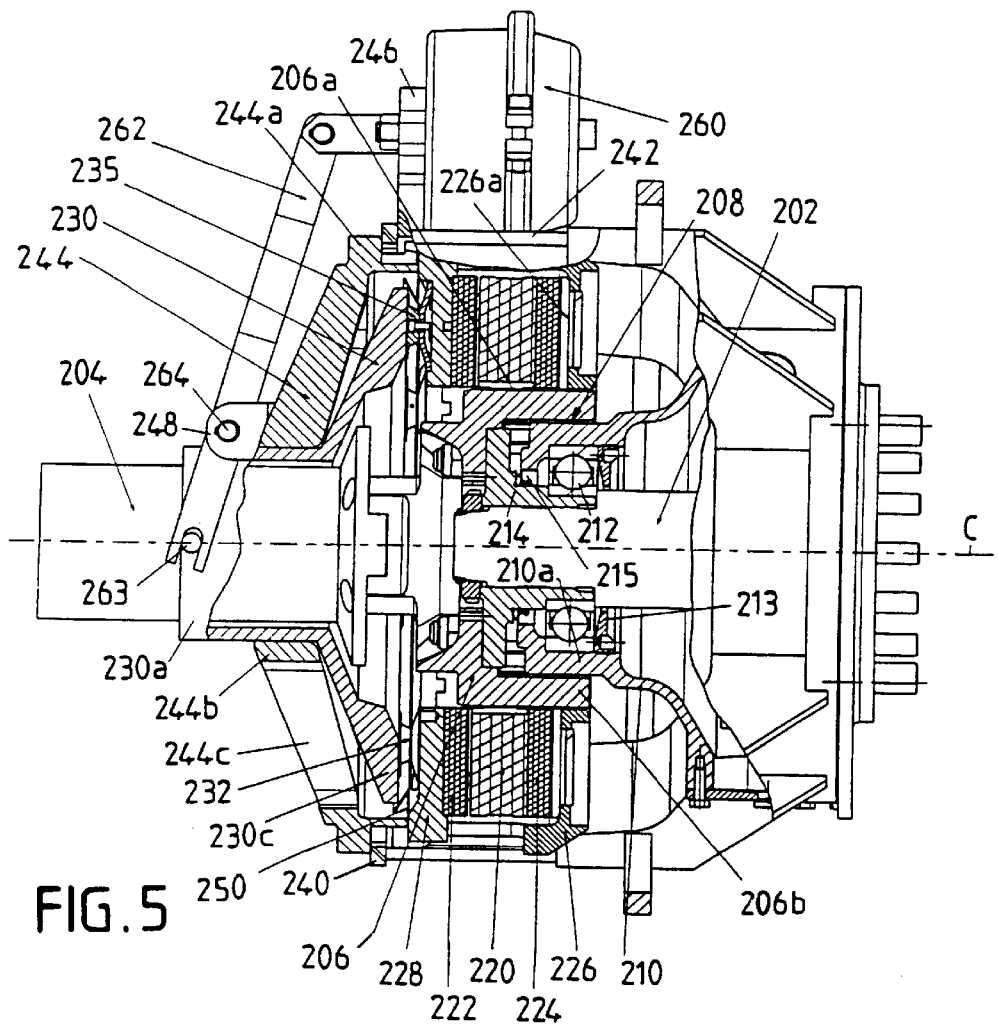
FIG. 5 is a section view showing another embodiment of a disk friction device of the invention, this time for a transmission brake of a heavy road vehicle.

Reference is made initially to FIGS. 1 and 2 which show a first embodiment of a friction device of the invention in an application to providing a motor bogie brake for a rail vehicle.

The friction device is mounted at the end of a drive axle shaft 10. It comprises an axially-aligned set of disks comprising three stator disks 21, 23, and 25 with two rotor disks 22 and 24 interposed between them, the disks being situated inside a casing 50, between a thrust structure 30 and a backing structure 40. The disks have the same axis A as the shaft 10. The shaft 10 is braked by clamping the disks 21 to 25 against one another between the thrust structure 30 and the backing structure 40 under thrust generated by a pneumatic actuator 60.

The casing 50 has a first end wall 51 situated adjacent to the thrust structure, a second end wall 52 opposite the first end wall and supporting the backing structure, and a peripheral wall. The peripheral wall is implemented by bars 53 extending parallel to the axis A and regularly distributed around it. The bars 53 extend between two rings 53a and 53b which are fixed by screws to the end walls 51 and 52 and which leave axially-extending slots 54 between them. The end wall 52 has a central opening in which there is received a rotary bearing unit 11 for the shaft 10.

The bearing unit 11 comprises a sleeve received in the central opening of the wall 52 and fixed thereto by screws passing through an outwardly-directed flange 11a. The bearing unit 11 contains a ball bearing 13 and a roller bearing 14 supporting the shaft 10.

The connection between the shaft 10 and the rotor disk is provided by means of a piece 15 fixed to the shaft 10 by having its central portion screwed to the end of the shaft. At its periphery, the piece 15, also referred to as a "bowl", has a plurality of branches 16 which extend parallel to the axis A. A rider, or staple, 17 is fixed on each branch 16 by means of rivets. The riders 15 penetrate into corresponding notches formed in the inside edge rings of the disks 22 and 24.

Along the outside edge rings of the stator disk 21, 23, and 25 there are crenellations separated by notches. The bars 53 of the casing 50 penetrate into the notches of the stator disks, thereby preventing the stator disks from rotating relative to the casing. The casing is fixed to the bogie of the vehicle via its wall 52 by means of screws (not shown).

The thrust structure 30 comprises a thrust piece 31 having a central portion 31a forming a setback received in the axial passage 18 surrounded by the disks and by the branches 16 of the connection piece 15. The central portion 31a is connected to an annular peripheral portion 31c of the thrust piece by a cylindrical portion 31b. The peripheral portion 31c of the thrust piece is situated inside the casing 50, close to the end wall 51.

The thrust piece 31 bears against the outside face of the stator disk 21 by means of cups 32 fixed on the peripheral portion 31c and regularly distributed around the axis A (see dashed lines in FIG. 2). Each cup 32 is fixed by means of a screw 34 which urges the base 32a of the cup against the thrust piece via an interposed spacer 35. Each cup flares towards the outside end face of the stator disk 21 and bears thereagainst via its own outer edge 32b.

The backing structure 40 has an annular backing piece 41 engaged on an internal shoulder 52a of the wall 52 of the casing and is fixed thereto by screw engagement. The backing piece 41 has two sets of cups 42, 43 disposed in pairs, having their bases 42a, 43a back to back, and regularly distributed around the axis A. Each pair of cups 42–43 is fixed to the piece 41 by a screw 44. The cups 42 bear against the outside end face of the stator disk 25 via their own outer edges 42b, while the cups 43 bear against the piece 41 via their own outer edges 43b, with spacers 45 being interposed.

As shown in FIG. 1, the pneumatic actuator 60 is fixed directly to the end wall 51 of the casing 50, on the outside thereof. The piston-forming moving portion 61 of the actuator passes through a central opening in the wall 51 and is fixed to the central portion 31a of the thrust piece 31. As a result, overall size is kept to a minimum with the connection between the thrust piece and the actuator extending inside the passage 18.

It is important to limit the transfer of heat to the shaft 10 as generated by friction between the disks 21 to 25, and in particular it is important to limit the transfer of heat to the bearing unit 11 and beyond that to the drive members (not shown), and likewise to the actuator 60.

A significant fraction of the heat is evacuated through the ventilation slots 54 at the periphery of the casing 50. The cups 32, 42, and 43 which provide small contact areas, and the spacers 35 and 45, e.g. made of stainless steel such as A151 316L grade steel, limit transfer by conduction from stator disks 21, 25 to the thrust and backing structures, respectively. Transfer by conduction between the rotor disks 22, 24 and the shaft 10 can be limited by making the riders 17 out of a materiel that is a poor conductor of heat, for example, likewise, stainless steel.

Transfer of heat to the shaft 10 by radiation or by convection is limited by the connection piece 15 which forms a heat screen at the end of the passage 18. An additional heat screen could be provided in the form of a wall 70 whose profile is of appropriate shape to be received in the space situated around the shaft and defined at one end by the backing piece 41, the wall 52, and the bearing unit 11, and at its other end by the disks and the connection piece 15. The wall 70 is held in position via its peripheral edge clamped between the cups 42 and the cups 43. The wall 70 can be made of sheet metal, e.g. of stainless steel, or it can comprise a plurality of metal sheets that are spaced apart from one another by one or more layers of air or spaces filled with insulation. In the example shown, the wall 70 is a multiple-layer wall made up of two metal sheets 71 and 72 which are pressed against each other at their ends and which leave a layer of air 73 between each other between said ends.

In addition, the transfer of heat along the shaft 10 is limited by one or more heat barriers provided in the bearing unit 11. A first barrier is formed by an inside flange of the bearing unit 11 which forms a lip 11b inside the casing 50 and co-operating with a ring 74 mounted on the shaft 10 and provided with a gasket 75 protecting the ball bearing 13. Between the ball bearing and the roller bearing 14, there is provided a second barrier made up of two rings 76 and 77 of complementary profile and secured respectively to the shaft 10 and to the bearing unit 11, and imposing a tortuous path for air. Finally, the outside end of the bearing unit 11 has two rings 78 and 79 which serve not only to hold the roller bearing 14 in its housing, but also to present portions of complementary profile that further constrain air to follow a tortuous path.

FIGS. 3 and 4 show another embodiment of a friction device for a motor bogie brake. Elements that are common to this embodiment and the embodiment of FIGS. 1 and 2 are given the same reference numerals and are not described again in detail.

Compared with the above-described device, the device of FIGS. 3 and 4 differs in particular in that the actuator 60 is fixed to the end wall of the casing 50 opposite from its end situated beside the thrust structure 130, and the force exerted by the actuator is transmitted to the thrust structure via a mechanical lever connection.

The thrust structure 130 comprises a thrust piece 131 having a central portion 131a of tubular shape and an annular peripheral portion 131b connected to the central portion. Cups 32 are fixed to the peripheral portion 131b as in the preceding embodiment. The tubular portion 131a can slide parallel to the axis A in a sleeve 55 received in a central opening of the wall 51 and secured to a skirt 55a fixed to the end wall 51 of the casing 50 by screw engagement.

The actuator 60 has its cylinder 62 hinged adjacent to its rear face about a pin 63 carried by two lugs 64 fixed on an extension of the end wall 52 of the casing 50. The connection between the moving portion 61 of the actuator and the central portion 131a of the thrust piece 131 is provided by means of two rockers 65. At a first end, each rocker is hinged on pivots 67 situated at diametrically opposite locations on the front of the moving part 61 of the actuator. At their opposite second ends, the rockers are hinged to the ends of a rod 68 which passes though opposite holes formed in the portion 131a of the thrust piece and which extends perpendicularly to the axis A. The rod 68 also passes through guide slots 56 formed in the sleeve 55 parallel to the axis A. Between their ends, the rockers are pivoted on pins 69 carried by lugs 57 secured to the sleeve 55. A spacer 66 reinforces the assembly comprising the two rockers 65.

When the actuator is energized in operation, the rockers 65 and 66 pivot about the pins 69, thereby causing the thrust piece 131 to move in translation as guided by the slots 56, and consequently causing a force to be applied against the disks 21 to 25. By the lever effect, the rockers 65, 66 amplify the force generated by the actuator. In operation, the cylinder 62 of the actuator pivots a little about the pin 63. It can be supported by means of a hinged cradle 58 mounted on a plate 59 which is fixed to the end wall 52 of the casing. The cradle 58 has two forks 58a in which studs 62a are situated at diametrically opposite locations of the actuator cylinder 62 and at the front end thereof.

The connection between the shaft 50 and the rotor disks 22 and 24 is provided by means of a piece 115 whose central portion is in the form of a frustoconical sleeve 115a engaged as a force-fit on an end portion 10a of corresponding frustoconical shape on the shaft 10. The sleeve 115a is prevented from moving axially by a nut 117 screwed onto the end of the shaft 10. The sleeve 115a is secured to a plurality of branches 116a that are regularly distributed around the axis A. As in the preceding embodiment, the branches 116 are connected to the rotor disks 22 and 24 by means of riders 17 riveted onto the branches 116 and penetrating into notches in the inside rings of the disks.

The backing structure 40 with the backing piece 41 and the two sets of cups 42, 43, and likewise the bearing unit 11 with its bearings 13 and 14 and the heat barriers situated along the bearing unit are identical to those of the preceding embodiment. In a manner similar to that provided therein, a heat screen 170 is interposed between the set of disks and the bearing unit 11 inside the casing. The screen 170 has multiple walls made up of two metal sheets 171 and 172 separated by a layer of air 173. The screen 170 is held by having its peripheral portion clamped between the sets of cups 42 and 43. Its shape is such that it extends from the cups 42, 43 to the vicinity of the connection piece 115.

Figure 7:
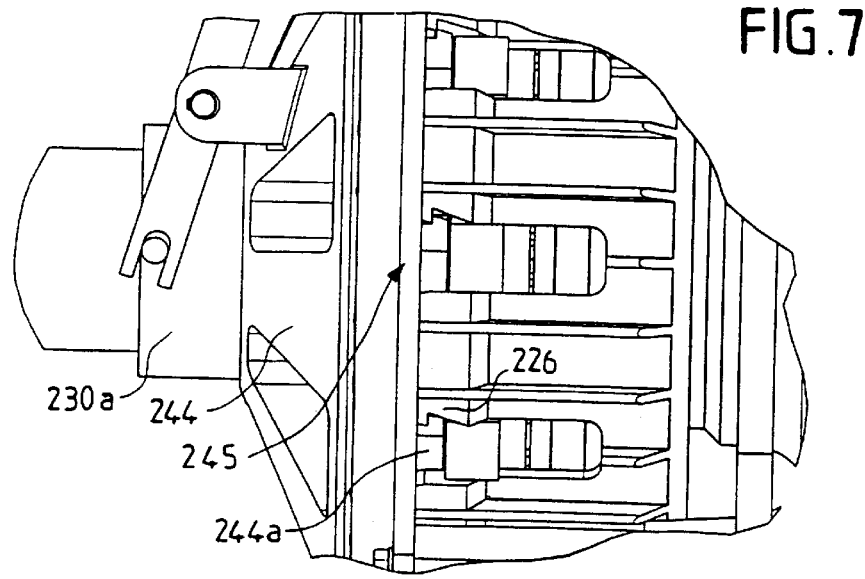
FIG. 7 is a detail view on a larger scale of the FIG. 5 device.
Figure 6:
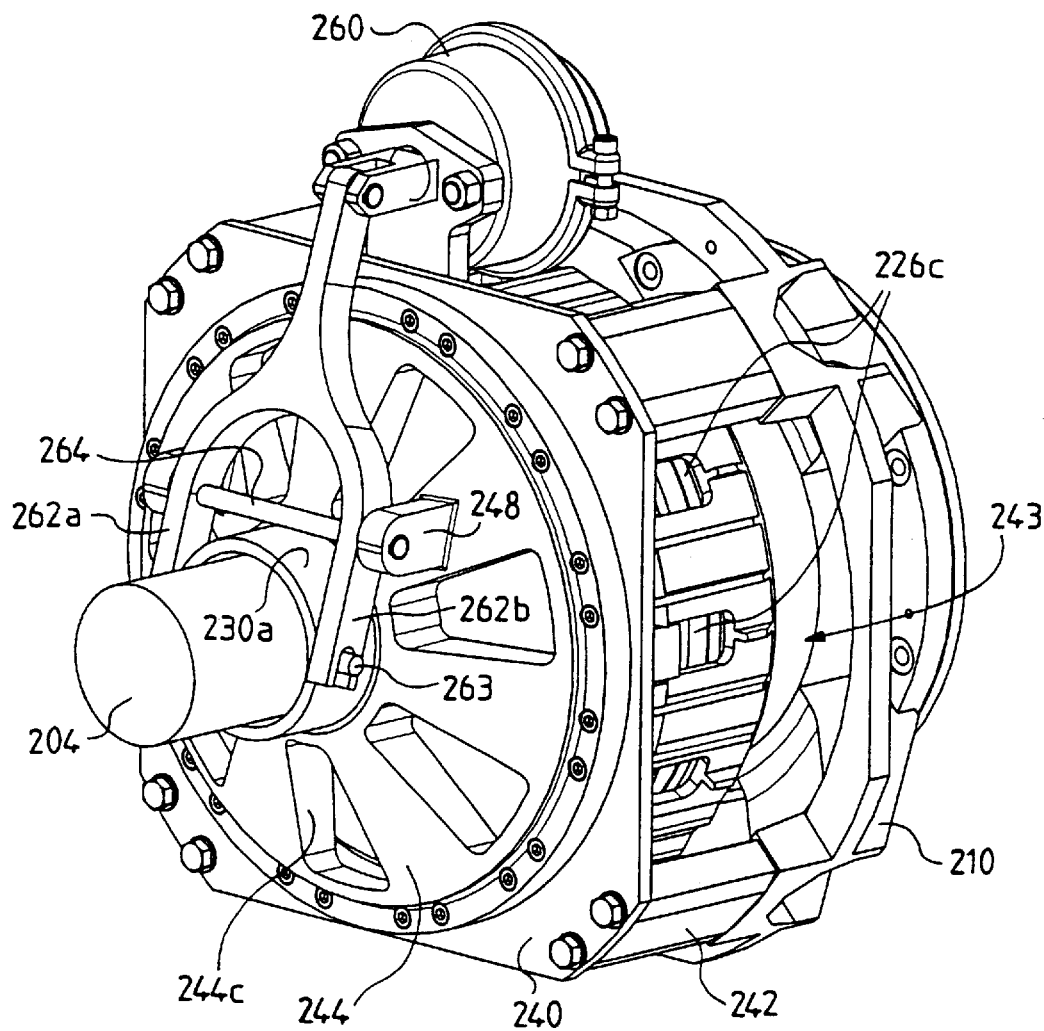
FIG. 6 is a perspective view of the device shown in FIG. 5.

An embodiment of a friction device of the invention for use as a transmission brake in a heavy road vehicle is shown in FIGS. 5 to 7.

The transmission brake is mounted between an outlet shaft 202 from a gearbox and a transmission shaft 204 on the same axis C, with these shafts being constrained to rotate together by means of a connection piece or "bowl" 206. The shaft 202 is supported by a central bearing 208 provided at the outlet from the case 210 of the gearbox and including a ball bearing 212 housed between the end portion 210a of the case 210 and a ring 214 mounted on the shaft 202.

The friction device comprises a set of three disks on the same axis comprising a rotor disk 220 disposed between two stator disks 222 and 224. The set of disks is housed inside a fixed casing 226 between an annular thrust plate 228 and a bearing surface formed by the end wall 226a of the casing 226.

The rotor disk on axis C has notches in its inside edge ring that is extend parallel to the axis C and into which there penetrate branches 206a formed on the periphery of the bowl 206.

The thrust plate 228 bears against the outside face of the stator disk 222 via a thrust structure 230 using cups 232. The thrust structure 230 has a central portion 230a in the form of a ring with the transmission shaft 204 passing therethrough and connected to an annular peripheral portion 230c in the form of a ring.

Each cup 232 has a base against which the ring 230c bears via a spacer 235 forming a heat barrier. Each cup 232 flares towards the thrust plate 228 and bears against the thrust plate via its own outer edge.

The casing 226 is situated inside a cage formed by the gearbox case 210, by a plate 240 forming an end wall and on which a sleeve 244 is secured by screw engagement, and by longitudinal members 242 extending parallel to the axis C and having the plate 240 secured thereto by screws. At its periphery, the sleeve 244 has a ring 244a against which the thrust plate 228 can come into abutment, and a heat screen 250 is interposed therebetween. In its central portion 244b, the sleeve 244 has an axial passage for the ring 230a of the thrust structure. The sleeve 244 also has ventilation openings 244c.

A pneumatic actuator 260 is mounted on a plate 246 secured to the casing 226. The moving portion of the actuator is hinged at one end to a rocker 262 in the form of a fork. The end portions of the branches 262a and 262b of the fork of the rocker are engaged on diametrically opposite studs 263 secured to the ring 230a of the thrust structure. Between its ends, the rocker 262 is pivotally mounted on a pin 264 supported at its ends by lugs 248 carried by the sleeves 244 (see FIG. 6).

When the actuator 260 is actuated, the rocker 262 is caused to rock about its axis 264 and to move the thrust structure in translation, and as a result a force is applied to the disks 222, 220, and 224 via the cups 232 and the thrust plate 228, thereby achieving the desired braking or retarding effect because of the connection between the rotor disk 220 and the shafts 202 and 204.

The rotary forces exerted on the end wall of the casing 226 by the stator disk 222 during braking or retarding are distributed by bayonet connections 245 between the casing 226 at its axial end remote from the end wall, and the ring 244a of the sleeve, as shown by the detail of FIG. 7.

A significant fraction of the heat generated by friction is evacuated through slots 226c formed at the periphery of the casing 226 and the opening 243 between the longitudinally extending members 242 (FIG. 6). The cups 232 and the spacers 235 limit the amount of heat that is transferred by conduction between the thrust plate 228 and the thrust structure 230. The heat screen 250 limits heat transfer by conduction between the thrust plate 228 and the sleeve 244. Transfer by conduction between the rotor disk 220 and the bowl 206 can be limited by providing the link branches 206a with riders made of a material that is a poor conductor, as in the preceding embodiments.

At the gearbox end, the bowl 206 presents a skirt 206*b* which surrounds the portion of the bearing 208 of the case 210 by engaging in a central opening in the end wall of the casing 226, thereby forming a heat barrier by imposing a tortuous path on air between the inside of the casing 226 and the inside of the case 210. The tortuous path can be added to by additional profiles at the end of the bearing 208 and the ring 214. A lip gasket 215 can also be provided at the outside end of the bearing 208. On the inside of the ball bearing 212, heat transfer by convection can be further limited by means of a ring 213 fixed to the case 210 and having the shaft 202 passing therethrough with substantially no clearance.

What is claimed is:

1. A friction device for braking or retarding a rotary drive shaft or a transmission, the device comprising:

a non-rotary casing having at least one end wall provided with a bearing unit for the rotary shaft;

a set of annular disks on a common axis, with at least friction portions thereof being made of a thermostructural composite material, the disks being received inside the casing and comprising at least one rotor disk constrained to rotate with the rotary shaft and at least two stator disks mounted on either side of the rotor disk and prevented from rotating relative to the casing;

a thrust structure situated facing an outside face of a first stator disk at a first end of the set of disks;

actuator means connected to the thrust structure; and a backing structure supported by the casing and situated facing an end face of a second stator disk at a second end of the set of disks:

the device being characterized in that:

the casing is in the form of a cage in which there are received the thrust structure, the set of disks, and the backing structure, and comprises a first end wall at the thrust structure end, a second end wall at the backing structure end, and a peripheral wall provided with ventilation openings;

the actuator means are constituted by a pneumatic actuator mechanically connected to a central portion of the thrust structure via a central opening in the first end wall of the casing; and thermal insulation means are arranged between the set of disks and the outside of the casing beside the end wall fitted with the bearing unit for the rotary shaft, and comprising at least one heat barrier situated at the bearing unit.

2. A device according to claim 1, characterized in that the pneumatic actuator is fixed to the first end wall of the casing.

3. A device according to claim 1, characterized in that the pneumatic actuator is connected to the central portion of the thrust structure via at least one lever.

4. A device according to claim 1, characterized in that the central portion of the thrust structure forms a setback which is received inside an axial passage surrounded by the disks, such that the mechanical connection between the actuator and the thrust structure extends at least in part in said axial passage.

5. A device according to claim 1, characterized in that the thrust structure comprises a thrust piece having a central portion connected to the actuator and an annular peripheral portion, and a set of cups fixed to the annular peripheral portion of the thrust piece and pressing against the outside face of the first stator disk.

6. A device according to claim 1, characterized in that the backing structure comprises an annular backing piece and a set of cups fixed to the annular backing piece and pressing against the outside face of the second stator disk.

7. A device according to claim 1, characterized in that the or each rotor disk has notches in its inside periphery and is connected to the rotary shaft via a piece fixed on the shaft and provided with riders which penetrate into the notches and which are made of a material that is a poor conductor of heat.

8. A device according to claim 1, characterized in that the thermal insulation means further comprise at least one heat screen situated inside the casing between the set of disks and the bearing unit for the rotary shaft.

9. A device according to claim 8, characterized in that the heat screen is carried by the backing structure.

10. A device according to claim 1, characterized in that the heat barrier situated at the bearing unit is constituted by at least one baffle imposing a tortuous path on the air flowing along the bearing unit.

11. A device according to claim 1, characterized in that the pneumatic actuator is fixed to the second end wall of the casing.

12. A device according to claim 11, characterized in that:

the pneumatic actuator is connected to the central portion of the thrust structure via at least one lever;

the central portion of the thrust structure forms a setback which is received inside an axial passage surrounded by the disks, such that the mechanical connection between the actuator and the thrust structure extends at least in part in said axial passage;

the thrust structure comprises a thrust piece having a central portion connected to the actuator and an annular peripheral portion, and a set of cups fixed to the annular peripheral portion of the thrust piece and pressing against the outside face of the first stator disk;

the backing structure comprises an annular backing piece and a set of cups fixed to the annular backing piece and pressing against the outside face of the second stator disk;

the or each rotor disk has notches in its inside periphery and is connected to the rotary shaft via a piece fixed on the shaft and provided with riders which penetrate into the notches and which are made of a material that is a poor conductor of heat;

the thermal insulation means further comprise at least one heat screen situated inside the casing between the set of disks and the bearing unit for the rotary shaft;

the heat screen is carried by the backing structure; and the heat barrier situated at the bearing unit is constituted by at least one baffle imposing a tortuous path on the air flowing along the bearing unit.

* * * * *